No. 619,744. Patented Feb. 21, 1899.
E. F. HEUER.
POTATO PLANTER.
(Application filed Sept. 14, 1898.)
(No Model.) 2 Sheets—Sheet 1.

Witnesses
Inventor
E. F. Heuer,
by H. B. Willson & Co
Attorneys

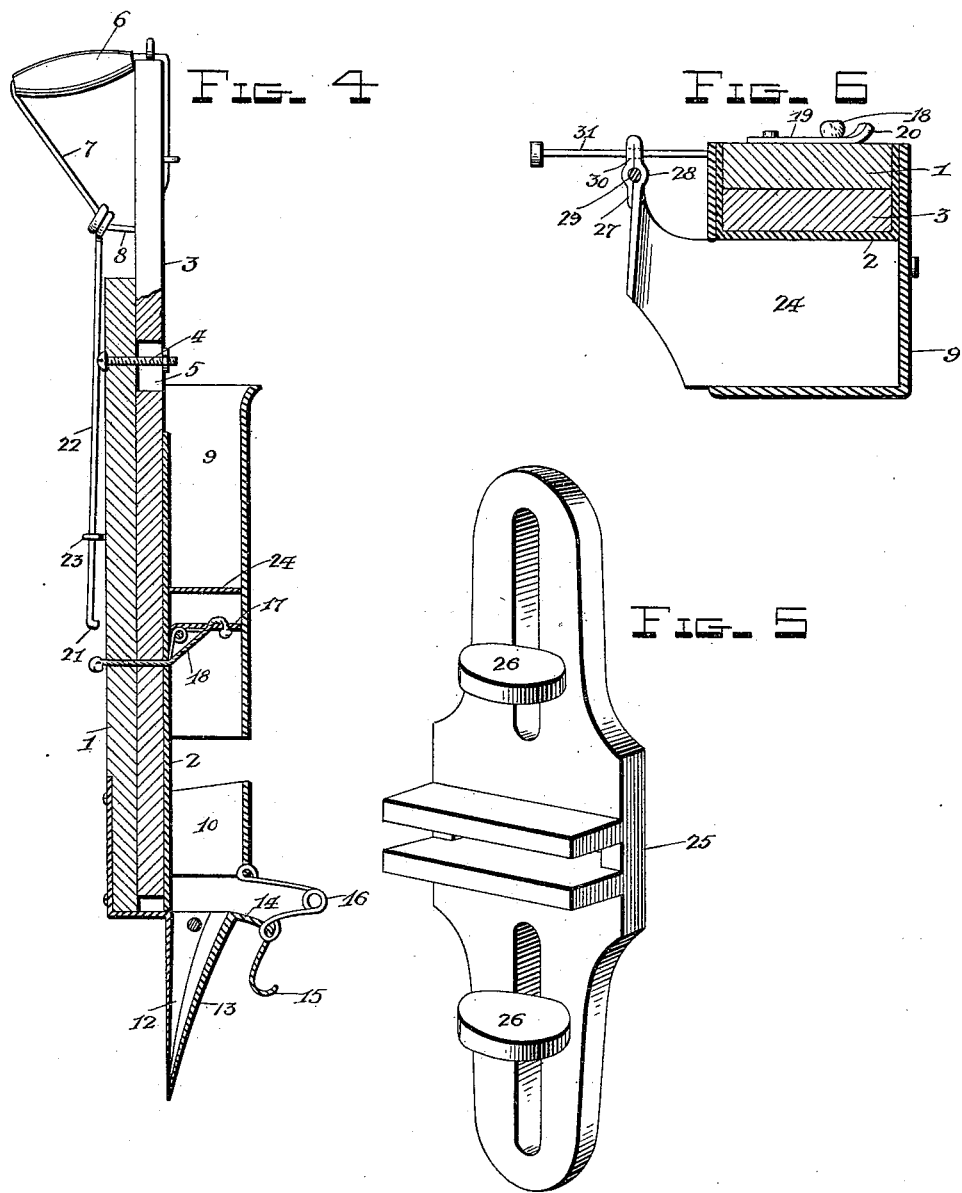

UNITED STATES PATENT OFFICE.

EDWARD F. HEUER, OF WAUTOMA, WISCONSIN.

POTATO-PLANTER.

SPECIFICATION forming part of Letters Patent No. 619,744, dated February 21, 1899.

Application filed September 14, 1898. Serial No. 690,902. (No model.)

*To all whom it may concern:*

Be it known that I, EDWARD FREDRICK HEUER, a citizen of the United States, residing at Wautoma, in the county of Waushara and State of Wisconsin, have invented certain new and useful Improvements in Potato-Planters; and I do declare the following to be a full, clear, and exact description of the invention, such as will enable others skilled in the art to which it appertains to make and use the same.

My invention relates to improvements in potato-planters, and more particularly to that class of hand-planters which open the ground, cut the potato, and drop the cut portion in said opening; and the object is to provide a simple, inexpensive, and effective device for performing this operation.

To this end the invention consists in certain features of construction and combination of parts, which will be hereinafter fully described and claimed.

The accompanying drawings show my invention in the best form now known to me, but many changes in the details might be made within the skill of a good mechanic without departing from the spirit of the invention as set forth in the claims at the end of this specification.

The same reference-figures indicate the same parts of the invention.

Figure 1:
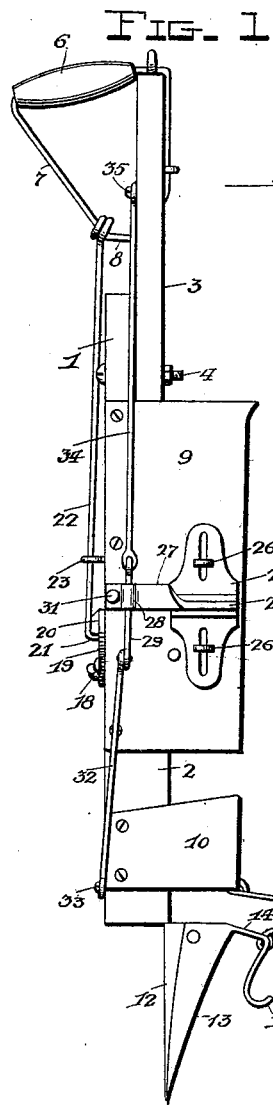
Figure 2:
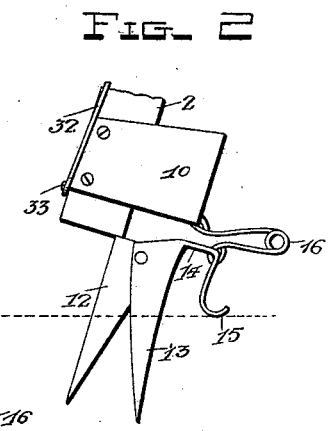
Figure 3:
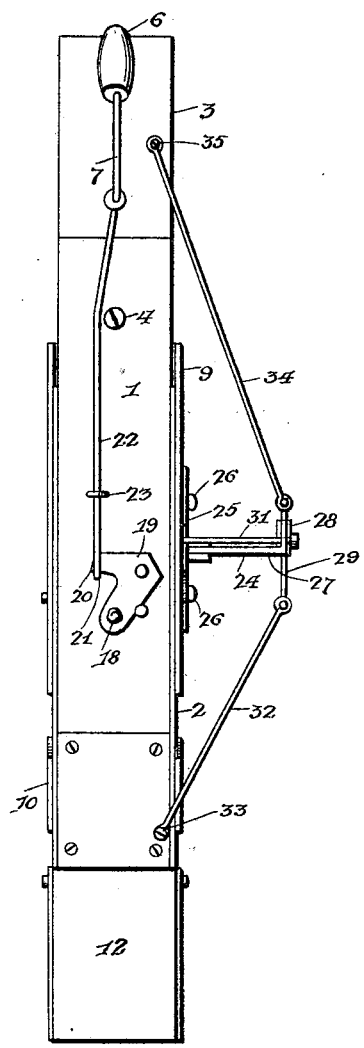

In the drawings, Figure 1 is a side elevation of my improved hand potato-planter. Fig. 2 is a similar view showing the manner of separating the opener-blades to drop the seed into the ground. Fig. 3 is a rear elevation. Fig. 4 is a longitudinal section. Fig. 5 is an enlarged detail view of the means for adjusting the cutter-blade. Fig. 6 is a transverse section on the line of the cutter-blade.

1 denotes the staff, and 2 a longitudinal guide-shoe fixed to the inside thereof, and in which the slide 3 reciprocates, its movement being limited in either direction by a bolt 4, fixed in the staff 1 and projecting through a longitudinal slot 5 in the slide. The upper end of the slide is provided with a lateral handle 6, supported at its outer end by a diagonal brace 7, the lower end of which is fixed to a screw-bolt 8, secured in the slide.

9 denotes the hopper, fixed to the staff 1 and open at both ends, and in line with the hopper is a guide 10, and below this guide are the opener-blades 12 13, the blade 12 being parallel with and fixed to the lower end of the staff 1, while the blade 13 is inclined and is pivoted at its upper end to the lateral lugs fixed on the blade.

14 represents a right-angular arm on the upper end of the blade 13, and it terminates in a downwardly-projecting leg 15, arranged approximately parallel with the movable blade.

16 denotes a V-shaped spring having its upper end fixed to the guide 10 and its lower end pivoted to the outer end of the arm 14, the tension of the said spring being exerted to close the blade 13.

17 denotes the transverse spring-actuated valve pivoted in the hopper, and 18 denotes a flexible cord extending from the free end of the valve through an orifice in the guide-shoe 2, a slot in the slide, and an alined orifice in the staff, and its free end is fixed in the lower arm of the bell-crank lever 19, fulcrumed on the outside of the staff, and the upper arm of this lever terminates in a beveled spur 20, which projects into the path of a lug or toe 21, formed on the free end of the reciprocating rod 22, which extends through a guide-staple 23, fixed in the staff, and the upper end of said rod is fixed to the screw-bolt 8, the operation being such that when the slide is forced down the rod 22 will be carried down with it, and the toe 21 will spring past the spur 20 on the angle-lever 19, and on the return motion of the slide and rod the toe 21 will engage the spur 20, drawing it up with it and opening the valve, and at or near the end of the upstroke of the rod the toe will slide off of the spur and allow the spring-actuated valve to return to its normal position.

24 denotes the cutter-blade, having a transverse movement in the longitudinal guide-plate 25, adjustably secured by the screws 26 26 to the outside of the hopper. When this blade is withdrawn, the seed-potato then rests upon the valve, and when the blade is forced inwardly a slice is cut off of the potato, the thickness of the slice depending on the parallel adjustment of the blade with reference to the valve.

The outer edge of the cutter-blade terminates in a lateral arm 27, which is formed with a longitudinal bearing-sleeve 28, in which is mounted a sliding rod 29, and on its extreme end is formed a transverse guide-orifice 30 to receive the lateral stud 31, fixed in the frame. The lower end of the rod 29 is pivoted to a guide-rod 32, the opposite end of which is pivoted to the screw 33, fixed in the staff. The upper end of the rod 29 is also pivoted to the lower end of a connecting-rod 34, the upper end of which is pivoted to a screw 35, fixed in the outside face of the slide 3, so that when the slide is forced downward the cutter-blade is withdrawn from the hopper a sufficient distance to allow the potato to drop part way past the cutter-blade and rest on the valve, and as the slide is raised the rod 34 forces the blade inwardly and slices off a portion of the potato, as heretofore described.

The operation of the device is as follows: The ground being first properly prepared, a seed-potato is dropped in the hopper and the blades 12 and 13 forced downward until the lower end of the leg 15 rests upon the ground, and in order to do this the slide 3 is forced downward to its full limit, which withdraws the cutter-blade 24, and the upper end of the staff moved in the direction of the arrow shown in Fig. 1, which causes the blades 12 13 to separate, as shown in Fig. 2. The slide is now raised, which causes the cutter-blade 24 to retract and cut off a slice of the potato, which in turn drops on the valve, and it is in turn tripped by the upward movement of the rod 22, attached to the slide. This allows the severed piece of potato to drop between the blades 12 and 13 and into the opening made in the ground. The planter is now raised clear of the ground and a slight pressure of the foot closes the ground over the seed and the operation is repeated at another point.

What I claim is—

1. A potato-planter comprising a staff, a hopper fixed to the frame, a slide reciprocating parallel with said staff, opener-blades secured to the lower end of said staff, a transverse cutter-blade, and a transverse valve mounted in said hopper, and operatively connected to said slide, substantially as and for the purpose set forth.

2. A potato-planter comprising a staff, a slide mounted thereon, and a hopper fixed thereto, in combination with a cutter-blade adjustably mounted in said hopper, a valve pivoted in said hopper below said blade, and means for simultaneously operating said slide, cutter-blade and valve, substantially as set forth.

3. A potato-planter comprising a staff, a reciprocating slide mounted on said staff, a hopper fixed to said staff, a cutter-blade having a transverse movement in said hopper, and means whereby the reciprocating movement of the slide will impart a transverse movement to the cutter-blade, substantially as described.

4. A potato-planter comprising the staff 1, the slide 3, the opener-blade 12, the guide 10, and the hopper 9 carried by said staff, the opener-blade 13 pivoted to said blade 12, the spring 16 connecting the blade 13 and fixed guide 10, the spring-actuated valve 17, and the adjustable cutter-blade 24 operatively connected to said slide 3, substantially as set forth.

In testimony whereof I have hereunto set my hand in presence of two subscribing witnesses.

E. F. HEUER.

Witnesses:
PETER WELLNER,
CHAS. R. SONTAG.